S. HALLE.
ELECTRIC HEATING DEVICE.
APPLICATION FILED DEC. 26, 1918.
1,412,735.
Patented Apr. 11, 1922.
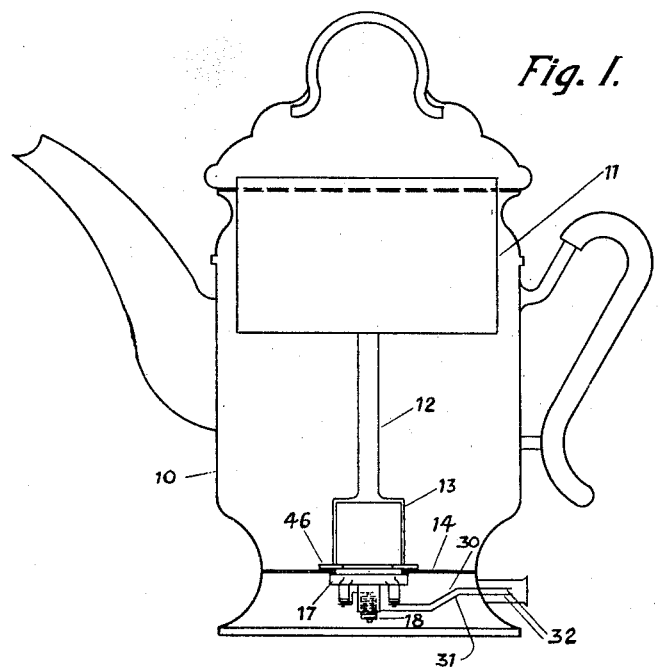
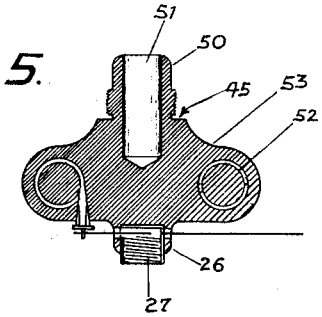
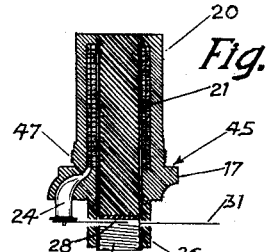
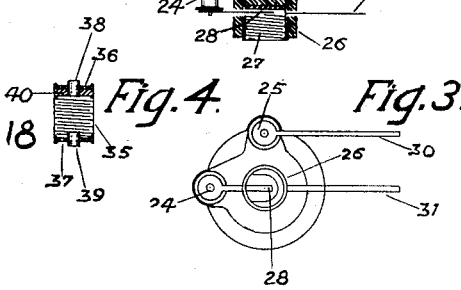
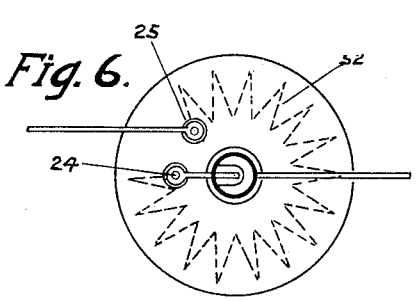
Inventor.
Simon Halle.
per
Attorney.

UNITED STATES PATENT OFFICE.

SIMON HALLE, OF ARLINGTON, MARYLAND, ASSIGNOR TO EDISON ELECTRIC APPLIANCE COMPANY, INC., A CORPORATION OF NEW YORK.

ELECTRIC HEATING DEVICE.

1,412,735.   Specification of Letters Patent.   Patented Apr. 11, 1922.

Application filed December 26, 1918. Serial No. 268,436.

*To all whom it may concern:*

Be it known that I, SIMON HALLE, a citizen of the United States of America, residing at Arlington, in the county of Baltimore, State of Maryland, have invented certain new and useful Improvements in Electric Heating Devices, of which the following is a specification.

An object of my invention is to provide an electric heating device in which the circuit is automatically opened when the temperature of the device or some part thereof, or the material being heated, reaches or exceeds a certain predetermined temperature. Another object of my invention is to provide an electric heater for fluids in which the circuit through the heating element is opened when a given predetermined temperature is reached or exceeded, as, for example, may happen when the volume of the fluid is less than some certain value.

In the accompanying drawings and the following detailed description, I have illustrated and described in some detail the best forms of my invention of which I am now aware, as my invention may be applied to a percolator. Fig. 1 is a sectional view in outline of the percolator. Fig. 2 is a cross-sectional view of a heating unit similar to that contained in Fig. 1. Fig. 3 is a view of the bottom of the heating unit of Fig. 2. Fig. 4 is a sectional view of the fusible member that I prefer to employ with my invention. Fig. 5 is a sectional view of a modified form of heating unit for a percolator. Fig. 6 is a view of the bottom of the heating unit of Fig. 5.

The percolator, Fig. 1, comprises the usual pot or vessel 10 containing the usual basket 11 for holding the coffee and the vertical pipe 12 and pump body 13 below the basket 11. In the floor 14 of the vessel is fastened the heating unit 17, which is shown in more detail in Figs. 2 and 3. In the lower end of the heating unit 17 is contained the fusible member which is shown in Fig. 4.

The heating unit 17 comprises a cylindrical part 20 of any suitable metal in which is enclosed or embedded a suitable number of turns 21 of the resistance conductor or wire, the resistance conductor being insulated electrically from the embedding metal. Preferably the conducting member is armored or sheath wire, such, for example, as is shown and described in the U. S. Patent to Whitney #1,093,512, or to R. H. Read, #1,127,281, and preferably the embedding metal is cast about the conductor. Such a construction is shown in the drawings herewith. Briefly, sheath wire comprises a center or core of resistance wire for conducting the current and in which the heat is developed; surrounding the core wire is a layer of suitable insulating material and outside of this insulating material is a metal sheath or armor. It should be understood, however, that my invention is not limited to armored or sheath wire.

Referring to Figs. 2 and 3, the terminals of the sheath wire resistance conductor 21 are brought out of the mass of metal of the heating unit at 24 and 25. Below the part 20 of the heating unit shown extends a downwardly opening cylindrical portion 26; the cylindrical walls of the portion 26 are of the same material as the portion 20, which embeds the resistance wire, and are integral therewith. The interior of this cylindrical portion 26 is lined with insulation containing a threaded metallic sleeve 27, and exposed in the upper part of this cavity is a contact 28, which is electrically connected with the terminal 24 of the resistance wire. The contact 28 is electrically insulated from both 26 and 27. The portion 26, with its insulating lining, metal threaded sleeve and exposed contact resembles quite closely the usual screw threaded socket for electric incandescent lamps. A conductor 30, connected to the terminal 25, and another conductor 31, electrically connected to the metal sleeve 27, provide the electrical connection from the percolator terminals 32 to the turns 21 of the heating unit.

In the device thus far described, however, the circuit from one of the percolator terminals 32 through the turns 21 of resistance wire and back to the other percolator terminal 32 is broken at one place, namely, between the exposed contact 28 and the metal sleeve 27. To complete this circuit, I use a thermal member 18 like that shown in Fig. 4. This member consists of an externally threaded metal sleeve 35 carrying at its two open ends the insulating portions or discs 36 and 37, these two portions of insulation being alike. The insulating portion 36 carries at its center a metallic contact 38, which extends for some distance from both sides of the insulating piece 36. In exactly the same relation the insulating portion 37 carries a metallic contact 39. Within the cylinder 35, there is a fusible element 40, which is a small portion of a fairly readily fusible metal, there being so much of this metal that when it is solidified with the cylinder 35 vertical, the metal 40 electrically connects the cylinder 35 with either 38 or 39, depending upon which contact 38 or 39 is engaged with the metal 40 when the latter hardens. After the metal 40 has once hardened, the fusible member 18 may be inverted without disturbing the relation between the fusible member 40 and the rest of the device. The fusible member shown in Fig. 4 has been reversed or inverted since the metal 40 was last cooled; accordingly the metal 40 has hardened surrounding the contact 38 and now electrically connects 38 with 35. With the metal 40 adjacent the contact 38, the contact 39 is insulated from the cylindrical member 35.

In assembling the percolator of Fig. 1, the heating unit of Fig. 2 is extended upwardly through an opening in the base or floor 14 of the vessel 10 until the shoulder 45 of the heating unit 17 rests against the lower surface of the floor 14. With the shoulder 45 throughout its full circumference engaged with the base 14, the nut 46 is screwed down over the screw threads 47 carried on part 20, and the nut 46 is firmly seated on the base 14; suitable packing may be used if desired between the floor 14 and either 45 or 46 or both. The base 14 is held between the nut 46 and the shoulder 45 and accordingly carries the heating unit 17. Any suitable form of pump 13, with its tube 12, and basket 11, may thereafter be placed over the heating unit 17, or rather, over the portion 20 of the heating unit 17, and the conductors 30 and 31 are connected to the inner ends of the percolator terminals 32. A fusible member 18, with the metal 40 adjacent its upper end, is then screwed into the projection 26, the cylindrical portion 35 making a metal to metal contact with the metal sleeve 27, and the contact 38 engaging with the exposed contact 28. Thereafter, when the percolator terminals 32 are connected to a source of suitable electromotive force, current flows from one of the terminals 32, through the connection 31, to the metal sleeve 27, the metal cylinder 35, the metal 40, the contact 38, the contact 28, the terminal 24, around the turns 21, to the contact 25, the connection 30, and the other percolator terminal 32. The metal 40 is chosen particuarly for its melting temperature. It is so chosen that when the vessel 10 contains at least sufficient liquid to prevent the injury of the vessel by the heat developed in the heating unit 17, then the metal 40 retains its solid form. When, however, the liquid in the vessel 10 further decreases in volume or when, for any other reason, the temperature of the part 20 of the heating unit tends to increase above the value safe for the vessel 10, then sufficient heat flows from the portion 20, through the walls of the portion 26, to the metal 40, to raise the temperature of this metal 40 above its melting point. As the metal 40 is melted, it falls to the bottom of the cylinder 35 and surrounding the contact 39. The metal 40 in falling from adjacent the contact 38 breaks the circuit through the heating unit thereat, and accordingly the current ceases to flow through the heating unit and the further development of heat therein is prevented. After the metal 40 has remained for a short time surrounding contact 39, enough heat will have escaped from the device to allow the metal 40 to solidify but this time, however, electrically connecting the cylinder 35 to the contact 39, rather than to the contact 38. Thereafter, the fusible member 18 may be unscrewed from the bottom of the heating unit 17, reversed end for end, and returned to the heating unit 17 with the contact 39 in engagement with the contact 28. Again the circuit is completed from the percolator terminals 32 through the turns 21 of the heating unit and the percolator may be returned to service. It is then ready for another like operation should the temperature of the device again rise above the safe value.

The heating unit of the Figs 5 and 6 is different from that of Figs. 2 and 3 only in form. The base 14 of the vessel as before rests on the shoulder 45. An upward projection 50 is provided with a cavity 51. The percolator pump sets over the projection 50, and the liquid is heated within the cavity 51. The heating element 52 is wound in the form of a helix which is itself assembled in the form of an angular ring as appears from Figs. 5 and 6. The mass of metal 53 embeds this heating element 52, and from the mass 53 projects the integral parts 50 and 26, the latter containing the part 27, similar to such part in the heating unit of Fig. 2. Other parts of the heating unit of Figs. 5 and 6, which will be recognized correspond to similar parts of heating unit of Figs. 2 and 3. The operation and use of heating unit of Figs. 5 and 6 is substantially like the use and operation of the heating unit of Figs. 2 and 3 and need not be further described.

It will be observed that in this invention there is a very intimate thermal connection between the heating element, the liquid or other material to be heated, and the fusible element. Correspondingly, the heating element need run at a temperature only a little above that desired for the part of the heating unit in actual contact with the material to be heated. For this reason, and also because of the good thermal relation between the thermal member 18 and the heating element, the thermal member is both sensitive and positive in its operation.

While I have illustrated and described in the accompanying drawing and in preceded description, the best forms of my invention of which I am now aware, it will be understood that my invention is not limited to those forms but that my invention is defined in the accompanying claims.

What I claim is:—

1. The combination of a vessel to contain a fluid to be heated, an electric heating element, a mass of metal embedding said heating element and projecting into said vessel to transmit heat from said heating element to the contents of said vessel, and a fusible member controlling the current through said heating element, said fusible member being carried by said mass of metal and adapted to be fused by heat therefrom to open the heating element circuit when the temperature exceeds a predetermined value.

2. The combination of a vessel to contain a fluid to be heated, an electric heating element, a mass of metal embedding said heating element and providing a part of the walls of said vessel to transmit heat from said element to the contents of the vessel, and a heat operated member outside said vessel controlling the current through said heating element, said heat operated member being carried by said mass of metal and adapted to be operated by heat therefrom to open the heating element circuit when the temperature passes a predetermined value.

3. The combination of an electric heating element, a mass of metal embedding said heating element and providing a heating surface, a heat operated member controlling the current through said heating element, and a connection for conducting heat from said mass of metal to said heat operated device, said heat operated device being adapted to be operated by heat transmitted from said mass to open the heating element circuit when the temperature passes a predetermined value.

4. The combination in a heating device, of an electric heating element, a mass of metal embedding said heating element and providing the heating surface of said heating device, and a heat operated member controlling the current through said heating element said heat operated member receiving heat from said mass of metal and being adapted to be operated by heat from said mass to open the heating element circuit when the temperature passes a predetermined value.

5. The combination with a vessel for containing a fluid to be heated, an electric heating element within the vessel, a body of metal within the vessel in heat conductive relation with said element and a fusible member outside the vessel in heat conductive relation with the element for opening the circuit to the heating element when the temperature reaches a predetermined value.

In testimony whereof I have hereunto set my hand at Chicago, Ill., this 20th day of December, 1918.

SIMON HALLE.